United States Patent [19]

Bentz

[11] Patent Number: 4,600,246
[45] Date of Patent: Jul. 15, 1986

[54] TREAD PLATE WITH GROUSERS HAVING CURVED REGIONS

[75] Inventor: Helmut Bentz, Dortmund, Fed. Rep. of Germany

[73] Assignee: O&K Orenstein & Koppel Aktiengesellschaft, Berlin, Fed. Rep. of Germany

[21] Appl. No.: 558,638

[22] Filed: Dec. 6, 1983

[30] Foreign Application Priority Data

Dec. 11, 1982 [DE] Fed. Rep. of Germany ....... 3246315

[51] Int. Cl.$^4$ ............................................. B62D 55/28
[52] U.S. Cl. ........................................ 305/54; 305/39
[58] Field of Search ................... 305/39, 54, 53, 55; 301/44 R, 44 T, 44 B

[56] References Cited

U.S. PATENT DOCUMENTS 2,866,667 12/1958 Ratkowski ............................ 305/54

FOREIGN PATENT DOCUMENTS 589562 12/1959 Canada ................................. 305/54

Primary Examiner—David A. Scherbel
Attorney, Agent, or Firm—Martin A. Farber

[57] ABSTRACT

Tread plates having two grousers for chain-driven vehicles, in which the grouser development in the region of the bolted connection to the carrier chain has radii of curvature and the distance within a linearly developed region between two grousers is approximately equal to the distance between the outer tread grousers of the region of linear chain travel.

1 Claim, 2 Drawing Figures

TREAD PLATE WITH GROUSERS HAVING CURVED REGIONS

BACKGROUND OF THE INVENTION

The invention relates to tread plates having two grousers for chain-driven vehicles.

For good efficiency in the operation of tread-driven chain vehicles, both a number of properties of each individual tread plate and the interaction of adjacent tread plates and, finally, their reaction on the carrier chain, the carrier-chain rollers and the carrier-chain drive wheel are of importance. Each individual trade plate must produce a high degree of traction between the vehicle and the ground, and assure good resistance to slippage in the direction of travel and also the direction transverse thereto. Furthermore, the bolt heads of the bolted connection of each individual tread plate to the carrier chain must be readily accessible to wrenches, and the grouser development must be such that little dirt can adhere either between the individual grousers or between the individual chain members.

A good self-cleaning of the chain must be possible. The shaping of each individual tread plate must, in particular with respect even to compacting of material, provide enough free space between two plates that extensive compacting of the material cannot take place after the chain bends into place. Otherwise, high tensile stresses are produced both on the chain links and on the bolts of the bolted connections to the carrier chain, and there is a danger that the tread plate bolts will be sheared off. Furthermore, the arrangement of the grousers on the tread plate must be so selected that the plate makes a stable equilibrium possible with respect to the chain, particularly in its development of the tread plate should, due to the arrangement of the grousers, subject the chain as a whole to as little load as possible, and also make it possible to turn the individual chain links in the region of the drive wheel for the carrier chain.

The object of the invention is to optimize the above-described properties with a two grouser tread plate.

Known single-grouser tread plates, for example in chain-driven vehicles or crawlers, have good traction with the ground but subject the chain to very high stresses. In addition, they turn turn only with great difficulty, so that they easily cause damage to the chain and therefore are used only in exceptional cases or else with unsuitable over-proportioning with respect to the drive as a whole.

Double grouser chains of rolled construction, to be sure, subject the chain as a whole to less stress. However, they produce poor traction with the ground and less assurance against slippage. The triple grouser plates which have been used possess the disadvantage of having only a small traction with the ground.

SUMMARY OF THE INVENTION

In accordance with the invention, with tread plates having two grousers for chain-driven vehicles, the grouser development has radii of curvature in the region of the bolted connection to the carrier plate, and the spacing between two grousers of one plate in their linearly developed region is approximately equal to the spacing between the outer grousers of two adjacent plates within the region of linear chain travel.

Furthermore, the development of the two grousers of a plate is asymmetrical in the region of the bolted connection to the carrier chain.

The bulge deviations of the two grouser developments of a tread plate differ by a factor of six in the region of the bolted connection to the carrier chain. At least the grouser development of one cleat can be partly linear in the region of the bolted connection to the carrier chain. In order to assure a condition of equilibrium for each tread plate, the grouser having the smaller bulge deviation and the partially linear grouser development within the region of the bolted connection to the carrier chain is arranged close to the region of the chain bolt. The nose of the tread plate is arranged on the grouser which has the smaller bulge deviation and which extends in part linearly partially within the region of the bolted connection to the carrier chain.

BRIEF DESCRIPTION OF THE DRAWINGS

With the above and other objects and advantages in view, the present invention will become more clearly understood in connection with the detailed description of a preferred embodiment, when considered with the accompanying drawings, of which.

DETAILED DESCRIPTION OF THE PREFERRED EMBODIMENT

Corresponding parts in the figures have been provided with the same reference numbers.

Figure 1:
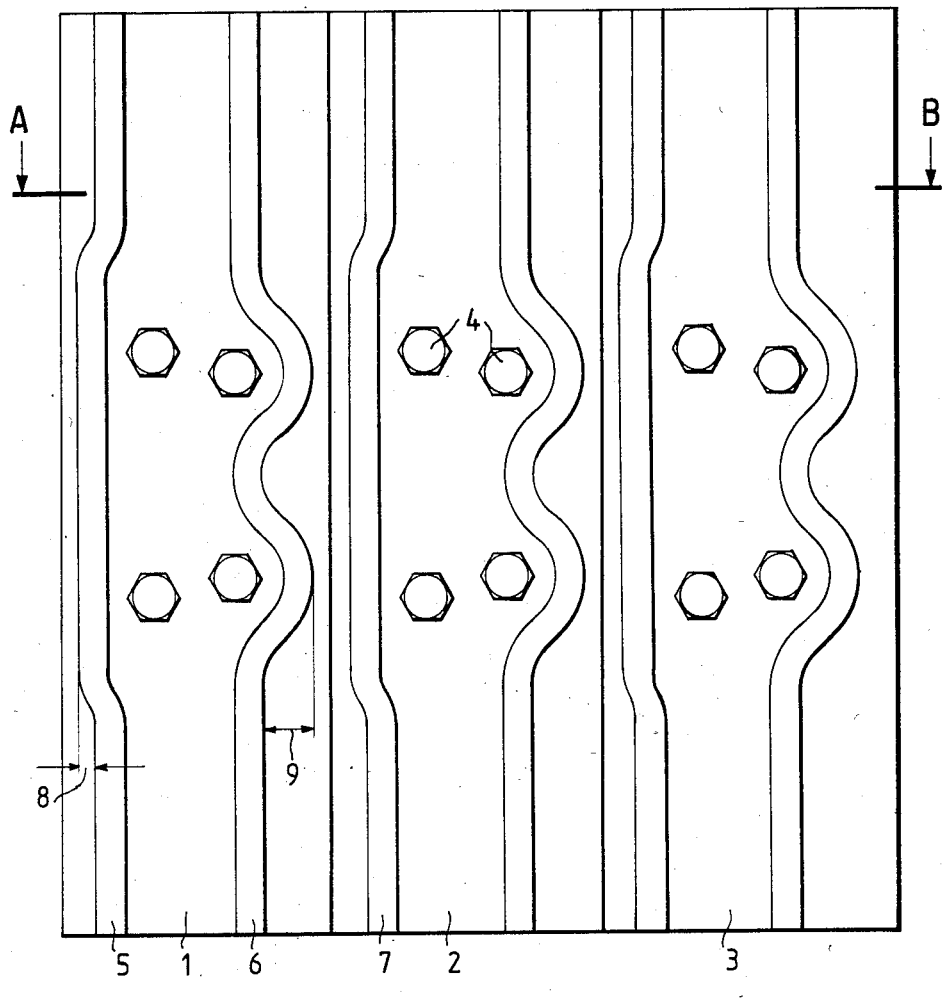
FIG. 1 is a bottom view of several tread plates.

In FIG. 1, a tread plate 1, an adjacent tread plate 2, and another tread plate 3 as well as bolt heads 4 of their bolted connections 4 to the carrier chain 10, 11, 12 are shown. It can be clearly noted from the figure that the grouser formation in the region of the bolt heads of the bolted connections of the carrier chain has bulges defining radii of curvature. In the linear regions the distance between the two grousers 5, 6 of the tread plate 1 is approximately equal to the distance between the outer grouser 6 and the adjacent grouser 7 of the adjacent tread plate 2. The figure furthermore shows that the development of the two grousers 5, 6 of the tread plate 1 is asymmetrical in the region of the bolted connections 4 to the carrier chain. The extent 8, 9 of the bulges from their maximum points to the respective linear regions (herein called the bulge deviations 8, 9) of the two grouser developments of the tread plate 1 in the region of the bolted connections to the carrier chain differs by at least a factor of six. It is also clear that at least the grouser development of one grouser, namely the grouser 5, is partially linear in the region of the bolted connections 4 to the carrier chain.

Figure 2:
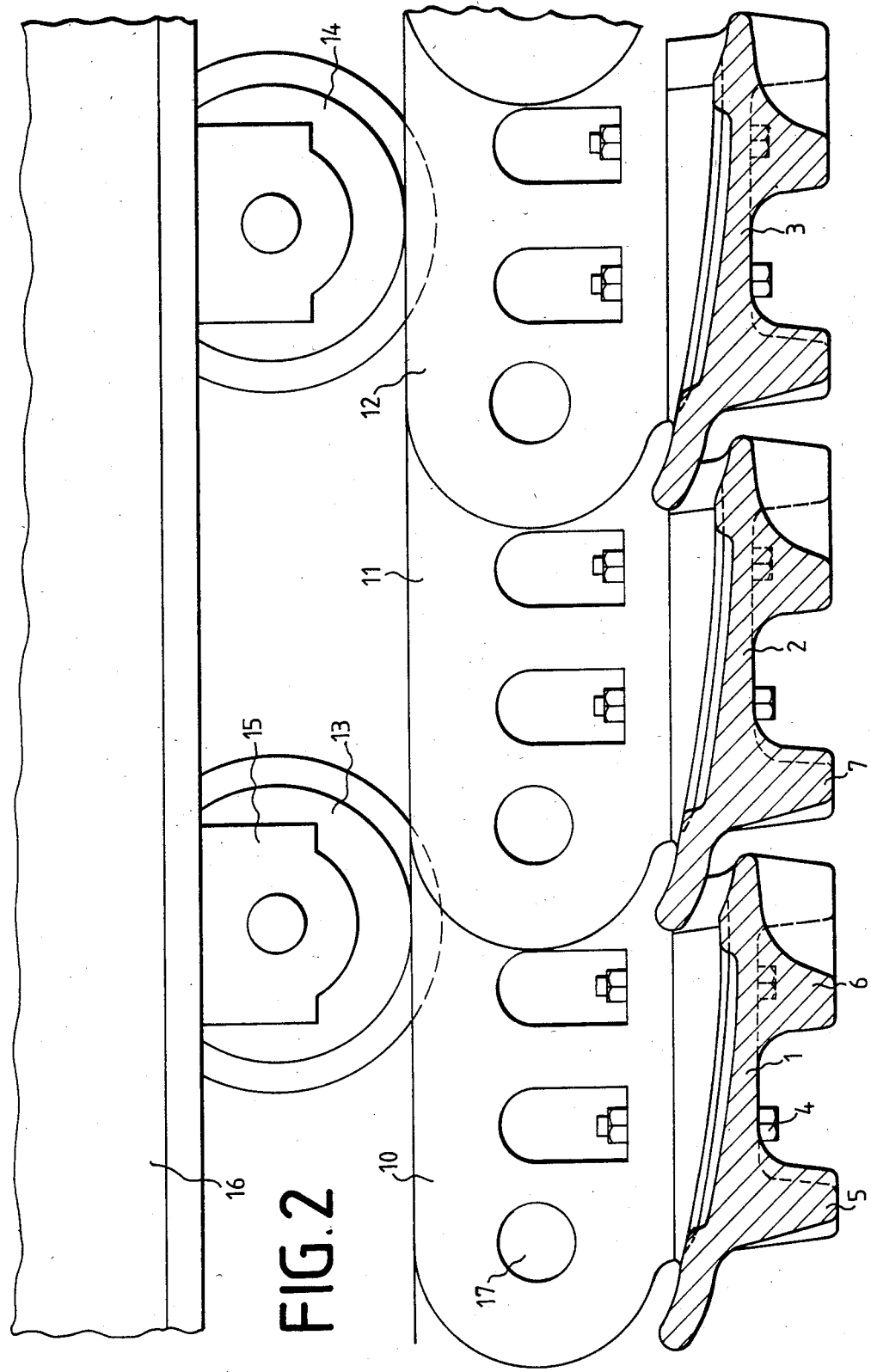
FIG. 2 is a section along the lines A-B through FIG. 1 with a further showing of parts which cooperate with the tread plates.

FIG. 2 shows the arrangement of the tread plate 1, of the adjacent tread plate 2 and of the further tread plate 3, on the link 10, the adjacent link 11, and the further link 12, respectively, of the carrier chain. The links 10, 11, 12 are pivoted to each other by chain bolts 17 so as to form the carrier chain. The chain is guided by carrier-chain rollers 13 and 14, each of which is mounted, via a bearing 15, on a carrier-chain carrier 16. The figure furthermore shows that the grouser 5 of the tread plate 1, which grouser has the smallest bulge deviation 8 as well as a partially linear grouser formation in the region of the bolted connections of the carrier chain, is arranged close to the vicinity of the chain bolt 17, particularly with respect to vertical center lines of the two elements. It is also shown that a tread-plate nose 18 is arranged on that grouser 5 which has the small bulge deviation 8 and which grouser 5 extends partly linearly in the region of the bolted connections 4 to the carrier plate 10.

From the figures, the advantages of the new crawler chain should be readily apparent. The grouser development shape of the tread plates, with good traction on the ground, provides a high resistance against slipping in the direction of travel of the chain and in the direction transverse thereto. Large articulation openings between the individual tread plates provide assurance, even with a small angle of opening, that there is no danger of earth being compacted, and thus no danger of the bolted connections being subjected to shearing stresses. The bolt heads 4 of the bolted connections are readily accessible. The linear grouser development outside the region of the bolted connections permits a good self-cleaning action. The specific arrangement of the grouser 5 with respect to the chain bolt assures stable equilibrium of the tread plate. As a whole, due to the formation of the tread plates in accordance with the invention, a crawler chain has been developed which, in practical use, has proven to be far superior to those previously known.

I claim:

1. In tread plates each having two grousers for chain-driven vehicles, the tread plates adapted to be bolted to a carrier chain by bolted connections forming a continuous chain which is movable so that the tread plates have positions of linear chain travel and curvilinear chain travel, the improvement wherein said two grousers are formed only in a region of the bolted connections with radii of curvature and in a region adjacent lateral edges of the tread plates with parallel lateral linear regions and with the distance between said two grousers of each said plate at said lateral linear regions being approximately equal to the distance between adjacent of said grousers of two adjacent of said plates respectively, in the position of linear chain travel, said parallel lateral linear regions extending perpendicularly to a direction of travel of the chain, and wherein with respect to a line between said two grousers of each said plate, said two grousers of each said plate are asymmetrical in said region of said bolted connections to said carrier chain, said radii form bulges having bulge deviations, said bulge deviations, respectively, of said each of said two grousers of each said tread plate differ by at least a factor of six in said region of said bolted connections to said carrier chain, each said plate has only two of said grousers, one of said grousers of each plate has two of said radii of curvature around adjacent of said bolted connections, respectively, forming two central of said bulges between and extending outwardly from said lateral linear regions thereof toward the closest adjacent of said plates, the other of said grousers forms one central of said bulges between and extending outwardly from said lateral linear regions thereof toward the closest adjacent of said plates, said one central of bulge of said other grouser has a linear portion extending across, and opposite and laterally beyond said two central bulges of said one grouser, said linear portion is parallel to said parallel lateral linear regions, each of said two central bulges of said one grouser is adjacent one of said bolted connections, respectively, said other grouser has a smaller bulge deviation than that of said one grouser of each said plate and is arranged in a portion of said plate so as to be near a chain bolt for said carrier chain when said plate is bolted to said carrier chain, said parallel linear regions extend from adjacent lateral edges of the tread plates to adjacent said region of said bolted connections.

* * * * *